(12) United States Patent
Carter

(10) Patent No.: US 8,674,580 B2
(45) Date of Patent: Mar. 18, 2014

(54) ELECTRIC MACHINE WITH END RING AND SUPPORTING TAB

(75) Inventor: Dane E. Carter, Noblesville, IN (US)

(73) Assignee: Remy Technologies, LLC, Pendleton, IN (US)

(*) Notice: Subject to any disclaimer, the term of this patent is extended or adjusted under 35 U.S.C. 154(b) by 285 days.

(21) Appl. No.: 13/297,916

(22) Filed: Nov. 16, 2011

(65) Prior Publication Data

US 2013/0119820 A1    May 16, 2013

(51) Int. Cl.
*H02K 1/06* (2006.01)
(52) U.S. Cl.
USPC ............. 310/216.114; 310/211; 29/596
(58) Field of Classification Search
USPC ............. 310/216.114, 211; 29/596
See application file for complete search history.

(56) References Cited

U.S. PATENT DOCUMENTS

| | | | |
|---|---|---|---|
| 3,783,317 A | 1/1974 | Sisk | |
| 4,309,635 A | 1/1982 | Sei et al. | |
| 4,333,026 A | 6/1982 | Bock et al. | |
| 4,760,300 A | 7/1988 | Yoshida et al. | |
| 4,970,424 A | 11/1990 | Nakamura et al. | |
| 5,067,550 A | 11/1991 | Maekawa et al. | |
| 5,767,607 A * | 6/1998 | Kieffer | 310/216.123 |
| 5,894,182 A * | 4/1999 | Saban et al. | 310/216.048 |
| 5,937,508 A | 8/1999 | Shiga | |
| 6,088,906 A | 7/2000 | Hsu et al. | |
| 6,177,749 B1 * | 1/2001 | Hussey et al. | 310/216.121 |
| 6,177,750 B1 * | 1/2001 | Tompkin | 310/216.114 |
| 6,252,329 B1 | 6/2001 | Del Fabbro | |
| 6,453,980 B1 | 9/2002 | Williams | |
| 7,019,428 B2 | 3/2006 | Sato | |
| 7,851,964 B2 | 12/2010 | Negrello et al. | |
| 8,410,643 B2 * | 4/2013 | Kottmyer et al. | 310/43 |
| 2003/0062786 A1 | 4/2003 | Reiter, Jr. et al. | |
| 2007/0247015 A1 * | 10/2007 | Dellinger | 310/217 |
| 2008/0166581 A1 | 7/2008 | Grott et al. | |

FOREIGN PATENT DOCUMENTS

| | | |
|---|---|---|
| EP | 2 044 673 B1 | 5/2010 |
| JP | 07-194058 A | 7/1995 |
| WO | WO 2010/108544 A2 | 9/2010 |

OTHER PUBLICATIONS

International Search Report and Written Opinion of the International Searching Authority, International Application No. PCT/US2012/065005, Mar. 29, 2013.

* cited by examiner

*Primary Examiner* — Nguyen N Hanh
(74) *Attorney, Agent, or Firm* — Bose McKinney & Evans LLP

(57) ABSTRACT

An electric machine with a stator and a rotor. The rotor core is formed by a stack of laminations with the laminations being generally planar and oriented substantially perpendicular to the rotational axis. One of the laminations includes an axially projecting tab. An electically conductive end ring is located at an axial end of the rotor core and is in communication with a plurality of axially extending conductor bars on the rotor core. The tab is coupled with the end ring and resists a portion of the centrifugal forces acting on the end ring during rotation of the rotor. A plurality of such tabs may be used to provide support to the end ring. A method of manufacture is also disclosed.

21 Claims, 4 Drawing Sheets

ELECTRIC MACHINE WITH END RING AND SUPPORTING TAB

BACKGROUND OF THE INVENTION

The present invention relates to electric machines and, more particularly, to an electric machine having a rotor with axially extending conductor bars and an end ring providing electrical communication between the conductor bars.

Induction motors are a common type of electric machine which utilizes a rotor with conductor bars and an end ring that provides electrical communication between the conductor bars. In operation, an AC current is supplied to the stator windings of the induction motor to produce a rotating magnetic field. The rotating electromagnetic field of the stator windings induces electrical currents in the axially extending conductor bars of the rotor. The induced current of the rotor also generates a rotating magnetic field that interacts with the rotating magnetic field of the stator windings to thereby forcibly rotate the rotor. The magnetic field induced in the rotor does not rotate at the same speed as the magnetic field generated by the stator windings, and as a result, such induction motors are also referred to as asynchronous motors. Induction motors have found wide acceptance in a broad range of applications.

An electric machine having the same general construction as an induction motor can also be operated as an induction generator to convert a mechanical torque applied to the rotor to electrical power. By rotating the rotor at a speed faster than the synchronous frequency, a typical induction motor can be operated as an induction generator. Wind turbines oftentimes use induction generators to convert a torque into electrical power. The general operating principles of induction motors and induction generators are well-known to those having ordinary skill in the art.

Induction motors and generators typically have a generally rugged and robust construction due to their relatively simple design which does not require brushes or commutators to provide electrical communication to the rotor. One feature of such electrical machines which is frequently subject to failure, however, is the electrically conductive end ring which provides electrical communication between the axially extending conductor bars of the rotor. Such end rings are often cast of an electrically conductive material such as copper and when the rotor experiences a high rotational speed, such end rings have been known to fail due to the high centripetal forces acting on the end ring. An improved electrical machine which can be employed as an induction motor or generator and has a robust end ring is desirable.

SUMMARY

The present invention provides an electrical machine which can be employed as an induction motor or an induction generator and includes an end ring with reinforcing tabs, thereby providing the end ring with a robust construction.

In one embodiment, an electric machine is provided with a stator and a rotor defining a rotational axis and having a rotor core. The rotor core is formed by a stack of laminations with a first lamination forming a first axial end of the rotor core. One of the stack of laminations includes at least one tab projecting axially beyond the first axial end. An end ring is disposed on the rotor core at the first axial end and is formed out of a conductive material. The end ring is in electrical communication with a plurality of axially extending conductive elements supported on the rotor core. The tab is coupled with the end ring wherein rotation of the rotor about the axis generates centrifugal forces acting on the end ring and the tab resists a portion of the centrifugal forces.

In another embodiment, an electric machine is provided that includes a stator and a rotor defining a rotational axis and having a rotor core. The rotor core is formed by a stack of laminations wherein the laminations are generally planar and oriented substantially perpendicular to the rotational axis. A first lamination forms a first substantially planar axial end of the rotor core. A plurality of spaced tabs are integrally formed with the first lamination and project axially beyond the first axial end. An end ring is disposed on the first axial end of the rotor core and is formed out of a conductive material. The end ring is in electrical communication with a plurality of axially extending conductive elements supported on the rotor core. The plurality of tabs are coupled with the end ring wherein rotation of the rotor about the axis generates centrifugal forces acting on the end ring and the plurality of tabs resist a portion of the centrifugal forces.

In yet another embodiment, a method of manufacturing an electric machine is provided wherein the method includes forming a rotor core with a stack of substantially planar laminations. The rotor core defines a central axis and has a first lamination which defines a first substantially planar axial end of the rotor core. At least one tab is formed in one of the laminations by bending the tab so that the tab projects axially beyond the first axial end of the rotor core. A conductive material is cast to form an end ring at the first axial end of the rotor core wherein the end ring contacts the tab. The method also includes assembling the rotor core with a stator to form the electric machine.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
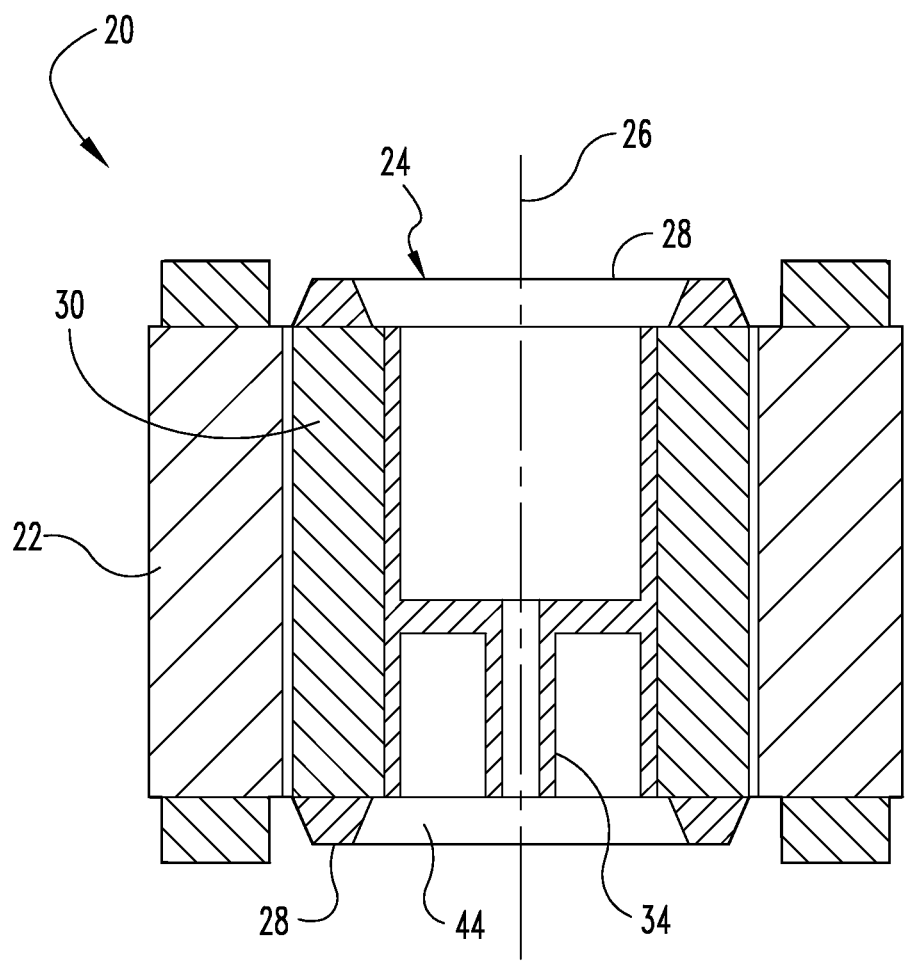
FIG. 1 is a schematic cross sectional view of an electric machine.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

An electric machine 20 is schematically depicted in FIG. 1. Electric machine 20 includes a stator 22 and a rotor 24 which rotates about rotational axis 26 during operation of electric machine 20. The illustrated electric machine 20 is an induction motor but could alternatively be employed as an induction generator.

Figure 4:
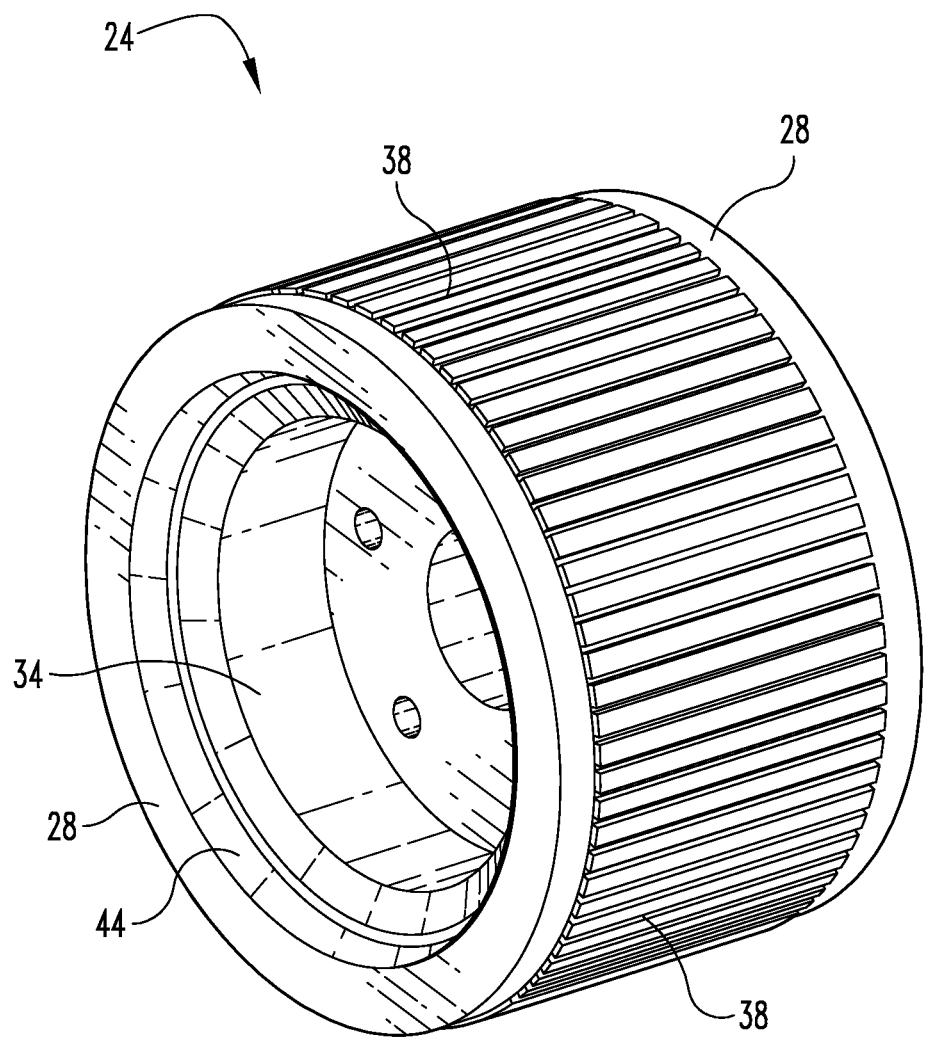
FIG. 4 is a perspective view of a rotor.
Figure 5:
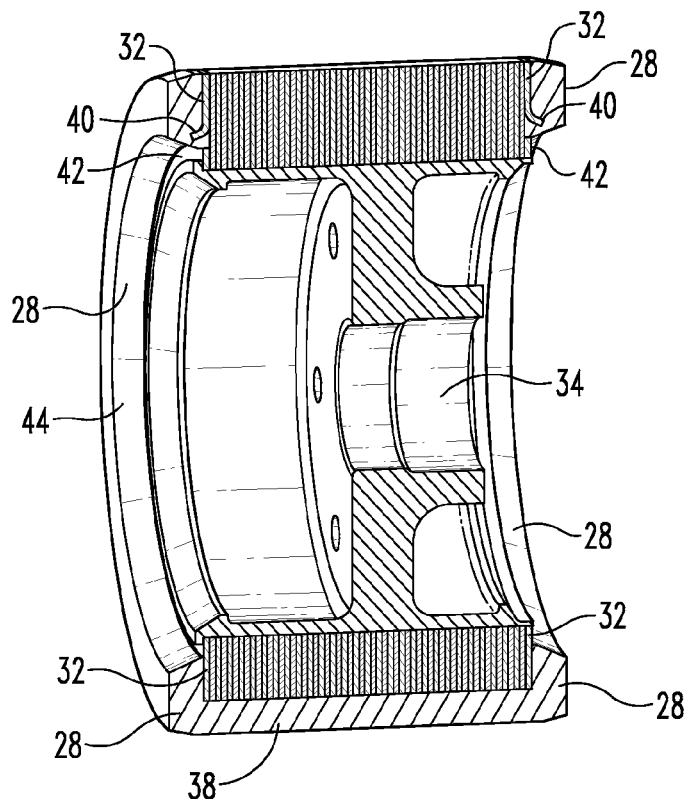
FIG. 5 is a cross sectional view of a rotor.

The depicted stator 22 has a conventional structure. The structure of rotor 24, however, provides enhanced support to end rings 28 as discussed in greater detail below. The overall structure of rotor 24 is best seen in FIGS. 4 and 5. Rotor 24 includes a rotor core 30 formed out of a plurality of stacked laminations 32. The rotor core 30 has a central bore in which a rotor hub 34 is mounted. The rotor hub 34 helps to secure the laminations 32 together and provides for the mounting of a shaft (not shown) to the rotor.

Figure 2:
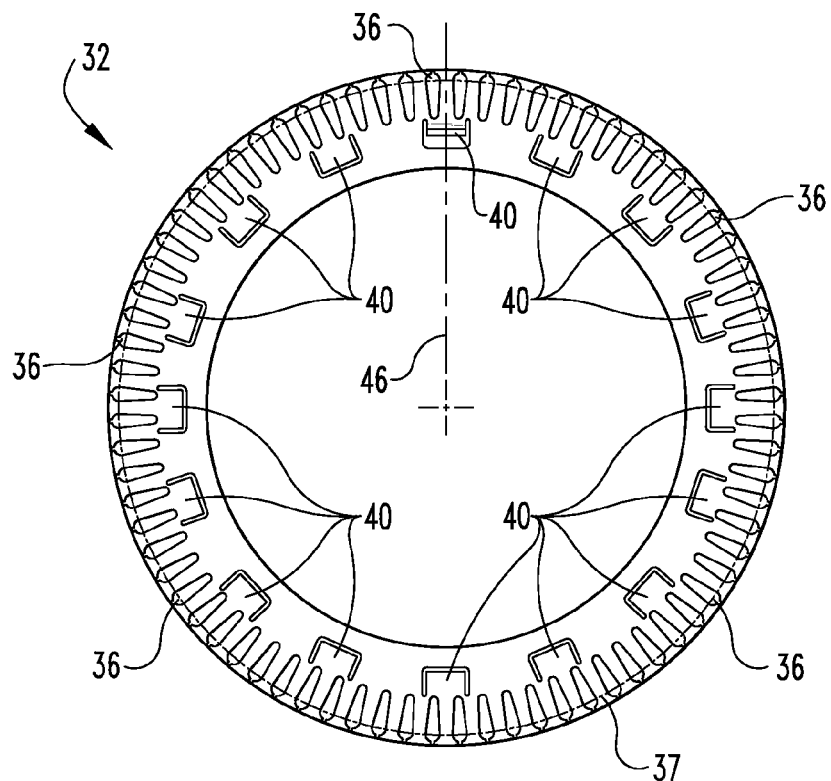
FIG. 2 is an end view of a rotor core lamination.

An end view of one of the laminations 32 is shown in FIG. 2. A plurality of slot openings 36 are located along the outer circumference of lamination 32. When a plurality of laminations 32 are stacked together, the slot openings 36 form a plurality of axially extending slots. Axially extending conductive elements 38 are disposed in the axially extending slots to form conductor bars of electric machine 20.

Figure 3:
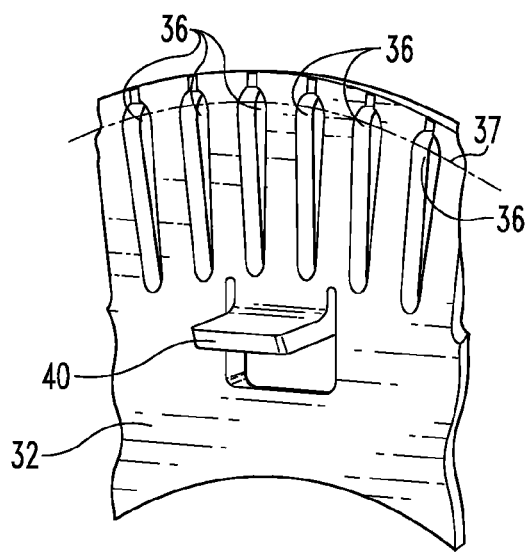
FIG. 3 is a detailed view of an axially projecting tab on a rotor core lamination.

The lamination depicted in FIGS. 2 and 3 has material which completely encircles openings 36 and in the illustrated embodiment, conductive elements 38 are formed by introducing a molten material, e.g., copper, into the axially extending slots formed by openings 36. After the conductive elements have cooled, the radially outermost portion of the laminations 32 and a minimal amount of conductive elements 38 are removed by machining. Dashed lines 37 in FIGS. 2 and 3 indicate the final outer diameter of the rotor after the machining process. A portion of the conductive elements 38 are exposed on the outer diameter of the rotor as a result of this machining as can be understood with reference to FIG. 4.

Laminations 32 are stamped from a sheet metal material and have a sheet-like or generally planar configuration. Laminations 32 are stacked to form rotor core 30 such that the planes defined by the laminations 32 are oriented perpendicular to rotational axis 26. The use of a stack of generally planar laminations to form a rotor core is well known in the art.

In addition to slot openings 36, the lamination 32 depicted in FIGS. 2 and 3 also include a plurality of tabs 40. Tabs 40 are used to provide structural support for the end rings 28 as discussed below. In the illustrated embodiment tabs 40 are equidistantly and angularly spaced about axis 26 and fully encircle axis 26. In FIG. 2, only one of the tabs 40, at roughly the 12 o'clock position, is bent to project out of the plane of the lamination 32. The remaining tabs 40 of the lamination 32, however, would be similarly bent prior to forming the end ring 28. FIG. 3 provides a perspective view of a tab 40 that has been bent and projects in an axial direction out of the plane of lamination 32. As can be seen in FIGS. 2 and 3, tab 40 is an integral portion of lamination 32 that can be formed by removing material about three sides of tab 40 and subsequently bending tab 40.

Rotor core 30 defines opposite axial ends 42 (FIGS. 5 and 6) which are defined by the generally planar surface of the laminations 32a located at the opposite ends of rotor core 30. In the illustrated embodiment tabs 40 on the laminations 32a are bent to project beyond the axial ends 42. The tabs 40 are coupled with end rings 28 such that when rotor 24 rotates about axis 26 the tabs 40 resist some of the centrifugal forces acting on end rings 28.

Figure 6:
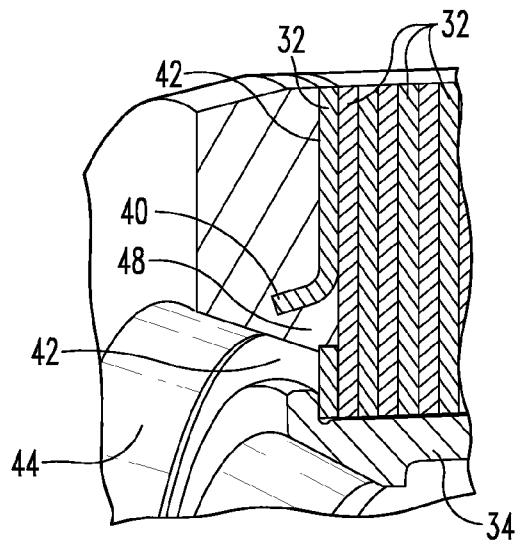
FIG. 6 is a detailed cross sectional view of an end ring.

As best seen in FIGS. 5 and 6, the not all of the laminations 32 forming rotor core 30 have tabs 40 which project out of the plane of the lamination. In the illustrated embodiment it is only the laminations 32a which are positioned on the opposite axial ends 42 of rotor core 30 which have tabs 40 that project axially out of the plane of the laminations 32. The middle laminations 32b located between opposite end laminations 32a do not have tabs 40 which are bent of the plane of the laminations. The middle laminations, however, may still have material removed therefrom to define the tabs 40 with the tabs 40 being unbent and remaining in the plane of the laminations 32b. Alternatively, middle laminations 32b may not have tabs 40 defined therein with only end laminations 32a having tabs 40 stamped therein. The desirability of whether or not middle laminations 32b should have tabs 40 stamped therein but remaining in the plane of the lamination will depend in large part on the equipment used to stamp and stack the laminations forming rotor core 30 and which manufacturing approach is more efficient the available equipment.

As can also be seen in FIGS. 5 and 6, tabs 40 project axially beyond the axial ends 42 of the rotor core 30 defined by the outward facing planar surface 33 of end laminations 32a and into end rings 28. Tabs 40 are engaged with the end rings 28 so that they can resist some of the centrifugal forces which act on the end rings 28 due to rotation of the rotor 24. In the illustrated embodiment, the tabs 40 are located at a position radially outwardly of the radially innermost surface 44 of end rings 28 with the tabs 40 being entirely surrounded by the conductive material used to form the end rings 28. By embedding the tabs 40 in the end rings 28 in this manner, the tabs 40 resist some of the centrifugal forces acting on the end rings.

Other configurations in which tabs 40 are used to resist some of the centrifugal forces acting on the end rings 28 could alternatively be employed. For example, tabs 40 could be positioned adjacent and radially outwardly of the radially outermost surface of end rings 28 to bear some of the centrifugal forces acting on end rings 28 during operation of the electric machine 20. Tabs 40 could also be positioned at the innermost surface 44 of end rings 28 with adhesion between the tabs 40 and end rings 28 providing for the transfer of forces between end rings 28 and tabs 40 and thereby allowing tabs 40 to resist some of the centrifugal forces acting on end rings 28.

As best seen in FIG. 6, a small portion 48 of the end ring 28 fills the empty space within the plane of end lamination 32a that is formed when tab 40 is bent out of the plane of lamination 32a. This engagement of end ring portion 48 with end lamination 32a also helps to resist the centrifugal forces acting on end ring 28 and secure end ring on rotor core 30.

As most easily seen in FIGS. 2 and 3, the illustrated tabs 40 define a generally planar structure that, when bent at an approximately 90 degree angle to lamination 32, are positioned substantially perpendicular to a radial line 46 extending perpendicularly outward from the rotational axis as well as lamination 32. This configuration provides a tab 40 that is well positioned to resist radially outwardly directed centrifugal forces. Alternative configurations of tabs 40, however, may also be used. For example, tabs 40 may be bent at an angle other than 90 degrees to the lamination 32 and still project axially beyond the axial end of the rotor core. Laminations 40 may also be formed such that the bend line between tab 40 and the remainder of the lamination 32 is not positioned perpendicular to radial line 46.

It is further noted that while it will generally be desirable to form axially projecting tabs 40 in the end laminations 32a, it may sometimes be desirable to completely remove tabs 40 from the end laminations 32a and have a tab 40 on one of the adjacent middle laminations 32b project axially through the resulting opening in the end lamination 32a and into the end ring 28. Such a configuration would allow more of the material used to form the end ring 28 to enter the opening formed by the missing tab in end lamination 32a and the opening in middle lamination 32b left by bending the tab 40 out of the plane of the middle lamination 32b. This and various other modifications to the illustrated embodiment are within the scope of the present invention.

The overall structure of rotor 30 can be seen in FIG. 5. As shown, rotor 30 includes end rings 28 which are disposed at opposite axial ends 42 of rotor 30. Conductive elements 38, also referred to herein as conductor bars, extend the axial length of the rotor core 30 and are connected with each of the end rings 28. End rings 28 and conductor bars 38 are formed out of a conductive material and are in electrical communication so that an electrical current can be induced in the end rings 28 and conductor bars 38 during operation of electrical machine 20.

The manufacture of rotor 30 will now be discussed. Initially, laminations 32 are stamped and stacked to form rotor core 30. Tabs 40 are bent out of the plane of at least one of the laminations 32 such that the tabs 40 project axially beyond one of the axial ends 42 of the rotor core 30. Generally, it will be advantageous to form a plurality of tabs 40 at each axial end 42 of the rotor core 30, however, in some situations it may be desirable to employ tabs 40 at only one axial end 42 of the rotor core 30. Following the formation of rotor core 30, the end rings 28 and conductor bars 38 are formed.

While various methods can be employed to form end rings 28 and conductor bars 38, these parts are advantageously formed simultaneously by casting a conductive material such as copper. For example, molds can be used to form the end rings 28 while slot openings 36 function as the mold for conductor bars 38. The resulting end rings 28 and conductor bars 38 are formed of an integrally cast material with tabs 40 projecting into the cast material of end rings 28. The integral nature of end rings 28 and conductor bars 38 not only promotes strength but also facilitates the communication and inducement of electrical current within end rings 28 and conductor bars 38. While the use of integrally cast end rings 28 and conductor bars 38 provides such advantages, alternative methods of forming end rings 28 and conductor bars 38 may also be employed.

If a hub 34 is used with the rotor 30, the hub 34 will be staked or otherwise secured to rotor core 30. The rotor 24 is then assembled with stator 22 to form the electric machine 20 which may take the form of an induction motor or induction generator.

While this invention has been described as having an exemplary design, the present invention may be further modified within the spirit and scope of this disclosure. This application is therefore intended to cover any variations, uses, or adaptations of the invention using its general principles.

What is claimed is:

1. An electric machine comprising:
a stator;
a rotor defining a rotational axis and having a rotor core, the rotor core being formed by a stack of laminations wherein a first lamination forms a first axial end of the rotor core and wherein one of the stack of laminations includes at least one tab projecting axially beyond the first axial end;
an end ring disposed on the rotor core at the first axial end, the end ring being formed of a conductive material and being in electrical communication with a plurality of axially extending conductive elements supported on the rotor core; and
wherein the tab is coupled with the end ring wherein rotation of the rotor about the axis generates centrifugal forces acting on the end ring and the tab resists a portion of the centrifugal forces.

2. The electric machine of claim 1 wherein the tab is an integral portion of the first lamination.

3. The electric machine of claim 1 wherein the at least one tab comprises a plurality of spaced tabs, each of the tabs being coupled with the end ring wherein rotation of the rotor about the axis generates centrifugal forces acting on the end ring and the plurality of tabs resist at least a portion of the centrifugal forces.

4. The electric machine of claim 1 wherein the tab projects into the end ring.

5. The electric machine of claim 1 wherein the tab defines a generally planar structure positioned substantially perpendicular to both the first lamination and a radial line extending perpendicularly outwardly from the rotational axis.

6. The electric machine of claim 1 wherein the at least one tab comprises a plurality of spaced tabs integrally formed with the first lamination and projecting into the end ring, each of the tabs defining a generally planar structure positioned substantially perpendicular to both the first lamination and a radial line extending perpendicularly outwardly from the rotational axis.

7. The electric machine of claim 1 wherein the end ring and the plurality of axially extending conductive elements are formed of integral cast material and the tab projects into the cast material.

8. An electric machine comprising:
a stator;
a rotor defining a rotational axis and having a rotor core, the rotor core being formed by a stack of laminations, the laminations being generally planar and oriented substantially perpendicular to the rotational axis and wherein a first lamination forms a first substantially planar axial end of the rotor core;
a plurality of spaced tabs integrally formed with the first lamination, the tabs projecting axially beyond the first axial end;
an end ring disposed on the first axial end of the rotor core, the end ring being formed out of a conductive material and being in electrical communication with a plurality of axially extending conductive elements supported on the rotor core; and
wherein the plurality of tabs are coupled with the end ring wherein rotation of the rotor about the axis generates centrifugal forces acting on the end ring and the plurality of tabs resist a portion of the centrifugal forces.

9. The electric machine of claim 8 wherein the plurality of tabs project into the end ring.

10. The electric machine of claim 8 wherein each of the plurality of tabs defines a generally planar structure positioned substantially perpendicular to both the first lamination and a radial line extending perpendicularly outwardly from the rotational axis.

11. The electric machine of claim 10 wherein the end ring and the plurality of axially extending conductive elements are formed of integral cast material and the plurality of tabs projects into the cast material.

12. The electric machine of claim 8 wherein the rotor core includes a second lamination forming a second substantially planar axial end of the rotor core;
a second plurality of angularly spaced tabs integrally formed with the second lamination, the second plurality of tabs projecting axially beyond the second axial end;
a second end ring disposed on the second axial end of the rotor core, the second end ring being formed out of a conductive material and being in electrical communication with the plurality of axially extending conductive elements supported on the rotor core; and
wherein the second plurality of tabs are coupled with the second end ring wherein rotation of the rotor about the axis generates centrifugal forces acting on the second end ring and the second plurality of tabs resist a portion of the centrifugal forces acting on the second end ring.

13. The electric machine of claim 12 wherein each of the tabs integral with the first and second laminations defines a generally planar structure positioned substantially perpendicular to both a radial line extending perpendicularly outwardly from the rotational axis and a respective one of the first and second laminations and wherein the end rings disposed at the first and second axial ends and the plurality of axially extending conductive elements are formed of an integrally cast material and each of the tabs integral with the first and second laminations project into the cast material.

14. A method of manufacturing an electric machine, the method comprising:
forming a rotor core with a stack of substantially planar laminations, the rotor core defining a central axis and having a first lamination which defines a first axial end of the rotor core;
forming at least one tab in one of the laminations and bending the tab so that the tab projects axially beyond the first axial end of the rotor core;
casting a conductive material to form an end ring at the first axial end of the rotor core wherein the conductive material of the end ring contacts the tab; and
assembling the rotor core with a stator.

15. The method of claim 14 wherein the step of forming at least one tab includes forming the tab in the first lamination.

16. The method of claim 15 wherein the step of forming at least one tab includes forming a plurality of spaced tabs in the first lamination and bending each of the plurality of tabs so that each tab projects axially beyond the first axial end of the rotor core.

17. The method of claim 16 wherein the end ring has a radially innermost surface and the end ring contacts the tab at a position radially outwardly of the radially innermost surface of the end ring and wherein the rotor core has a second lamination which defines a second axial end of the rotor core, the method further comprising:

forming a second plurality of tabs in the second lamination and bending the second plurality of tabs so that each of the second plurality of tabs project axially beyond the second axial end of the rotor core;
casting a conductive material to form a second end ring at the second axial end of the rotor core, the second end ring having a radially innermost surface wherein the second end ring engages the tab at a position radially outwardly of the radially innermost surface of the second end ring.

18. The method of claim 17 further comprising forming a plurality of axially extending slots in the rotor core and wherein the step of casting a conductive material includes casting the conductive material to form axially extending conductor bars in the slots of the rotor core integrally with the end rings positioned at the first and second axial ends of the rotor core.

19. The method of claim 14 wherein the at least one tab is substantially entirely surrounded by the conductive material forming the end ring.

20. The method of claim 14 wherein the tab defines a generally planar structure positioned substantially perpendicular to both the first lamination and a radial line extending perpendicularly outwardly from the central axis.

21. The method of claim 14 further comprising forming a plurality of axially extending slots in the rotor core and wherein the step of casting a conductive material includes casting the conductive material to form axially extending conductor bars in the slots of the rotor core integrally with the end ring.

* * * * *